United States Patent Office 3,473,271
Patented Oct. 21, 1969

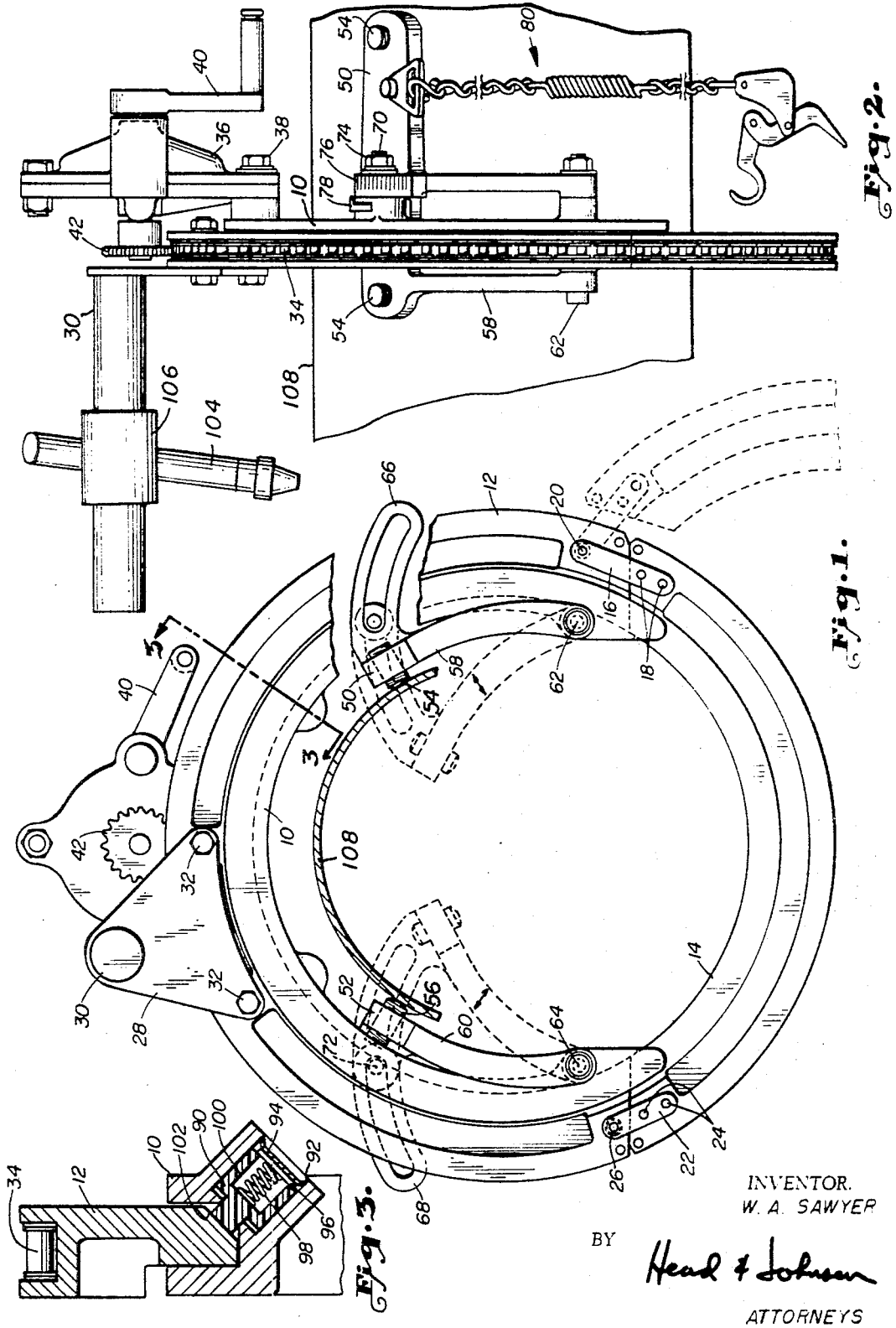

3,473,271
PIPE BEVELING MACHINES
Willard A. Sawyer, 3127 E. 49th St.,
Tulsa, Okla. 74105
Filed July 11, 1966, Ser. No. 564,350
Int. Cl. B24b 19/02
U.S. Cl. 51—241                                                6 Claims

ABSTRACT OF THE DISCLOSURE

A pipe beveling machine includes adjustable support members for use with pipe of varying diameters.

---

This invention relates to pipe beveling machines and more particularly to improvements thereto.

This invention has for its primary object the provision of providing adjustable means for adapting pipe beveling machines to various sizes of pipe eliminating the need for a plurality of machines and without involving tedious adjustments heretofore involved in the prior art devices. In particular, this invention provides pivotally adjustable saddle arm means which can be affixed at a desired and indexed position for a given diameter of pipe and which will ordinarily position the rotary beveling or cutting device coaxial with said pipe.

It is a further object of this invention to provide a bushing means associated with the traveling ring of the beveling device to maintain accurate alignment of the traveling ring substantially coaxial therewith and to compensate for wear of the traveling ring relative to its support bearing.

These and other objects of the invention will become more apparent upon further reading of the specification and claims when taken in conjunction wtih the following illustrations of which:

FIGURE 1 is a front elevational view of the pipe beveling machine and improvements of this invention.

FIGURE 2 is a side elevational view of the device of FIGURE 1 as depicted with a beveling torch upon a pipe.

FIGURE 3 is a sectional view taken along the line 3—3 of FIGURE 1.

Referring now to the drawings, a ring support member 10 is an arcuate member open at one portion thereof for adaptation about the pipe to be beveled, not shown in these views. The ring support member is adapted to support a rotatable traveling ring 12. The traveling ring is segmented to include an arcuate portion 14 which is hinged or pivotal by a portion 16 which interconnects from a pivot shaft 20 with the arcuate portion 14 by means of pins 18. At the other side a strap member 22 is rigidly held to arcuate portion 14 by pins 24 and extends over the traveling ring portion 12. A spring biased ball type detenting device, not shown, cooperatively engages with the opening 26 to retain the arcuate portion 14 securely attached to the traveling ring 12 to make a continuous ring. Plate 28 includes a beveling attachment shaft 30 rigidly attached to the traveling ring by bolts 32. Within a groove provided in the outer periphery of traveling ring 12 including the pivotal arcuate portion 14 is a standard roller chain 34, the chain being segmented to permit pivotal separation of portion 14. Attached to the ring support member 10 is drive mechanism 36 held by bolts 38 which drive mechanism is of a standard type generally including a driving handle 40 with the output being a driven sprocket member 42, the sprocket being in engagement with the roller chain 34 so as to provide rotative movement to the traveling ring 12 including its arcuate portion 14 relative to ring support member 10.

Saddle arms 50 and 52, respectively, include very fine or micrometer-like threaded spacer feet 54 and 56, respectively. The saddle arms include yoke portions 58 and 60, respectively, which are adapted to straddle the ring support member 10 and be pivotal about shaft bolts 62 and 64 which extend through the ring support member 10 each of which include a threaded nut for retaining the assembly. Extending outward from each saddle are index arms 66 and 68, respectively, which are movable relative to a threaded locking pin 70 which is formed as a part of ring support member 10. Each of the indexing arms includes an arcuate opening within which said locking pin operates. A lock washer and nut assembly 74, which is shown in FIGURE 2, maintains the saddle arm at a desired position relative to the diameter pipe which is being beveled. An index 76 is inscribed upon index arm 66 relative to pointer 78 which is affixed to the ring support member 10. The index preferably contains graduations for pipe, either for a given nominal or actual pipe size. To retain or strap the saddle arm and beveling apparatus to the pipe at a given position, a boomer and chain mechanism 80 of a well known type is adapted for extension around the pipe, usually underneath, from saddle arm to saddle arm.

Referring now to FIGURE 3, a traveling ring wear and alignment device is more adequately described. In the embodiment shown there are four of these devices substantially equally spaced about the ring support member 10. Each device includes a piston member 90 which may be formed of a synthetic resin and which is retained within opening 92 by a spring lock washer 94. A flat solid disc 96 is therebetween. A spring member 98 is adaptable within a recessed opening 100 of the piston member 90 and operates against the disc 96 to force the piston 90 outwardly against beveled surface 102 of the traveling ring 12 or portion 14, as the case may be.

In operation of the device of the invention the spacer feet 54 and 56 have been previously adjusted and calibrated relative to the index 76. Pivotal movement of the respective yoke arms 58 and 60 is inwardly to a desired position for a given pipe size whereafter each of the saddle arms are locked in their respective positions by a lock washer and nut assembly such as shown at 74. The arcuate portion 14 of the traveling ring 12 is open by release of the ball detent holding device (as partially shown in dotted lines) providing an opening whereby the saddle arms may be placed over the pipe 108 and rested thereupon afterwhich the arcuate portion 14 is pivoted by hinge plate 16 about shaft 20 into a locked position whereby the traveling ring 12 now defines a full circle about the pipe. By the use of squaring devices, the spacer feet may be properly adjusted so as to place the traveling ring in a plane substantially perpendicular the axis of the pipe whereby a full circle is generated upon rotation of the traveling ring. In the event other adjustments are necessary the spacer feet may be utilized to make more accurate adjustments. The beveling device, such as a cutting torch 104 or a grinding apparatus, equipment which is not specifically disclosed herein but is well known to men skilled in the art, is attached to the shaft 30, as for example by a movable sleeve 106 and aligned at the particular peripheral point that a bevel or cut is to be made. The saddle arms have been locked securely upon the pipe at this point utilizing the boom assembly 80 which extends partially circumferentially around the pipe beneath the pipe from saddle arm to saddle arm. Once the beveling device is in operation, rotation of the driving handle 40 rotates the corresponding sprocket 42 driving the traveling ring circumferentially about the pipe until the starting point is reached whereafter the assembly is dismantled in reverse order for utilization elsewhere.

The invention has been described with reference to specific and preferred embodiments. It will be apparent, however, that other modifications can be made without departing from the spirit and scope of this invention. Accordingly, this invention should be construed not to be limited to the embodiment herein described but should be limited only by the scope of the appended claims.

What is claimed:
1. In a pipe beveling machine having
a ring support member,
a traveling ring rotatably supported upon said support member,
a bevel cutting device attached to said traveling ring on one side thereof, and
a drive mechanism attached to said support member on the other side thereof and cooperatively engaged with said traveling ring to cause rotation thereof about said pipe,
the improvement in means for supporting said machine upon said pipe comprising:
opposed saddle arms supported by said ring support member and pivotal thereto in a plane substantially parallel to said traveling ring inwardly thereof, and
means to retain said saddle arms at a desired position relative to a given diameter pipe whereby said traveling ring is substantially co-axial with said pipe.
2. In a beveling machine of the type set forth in claim 1 the improvement including each of said saddle arms extending across the plane of said traveling ring and including yoke arms which straddle and pivot about said support member.
3. In a pipe beveling machine having
a ring support member,
a traveling ring rotatably supported upon said support member,
a bevel cutting device attached to said traveling ring on one side thereof, and
a drive mechanism attached to said support on the other side thereof and cooperatively engaged with said traveling ring to cause rotation thereof about said pipe,
the improvement in means for supporting said machine upon said pipe comprising:
opposed saddle arms supported by said ring support member and pivotal thereto in a plane substantially parallel to said traveling ring inwardly thereof, said saddle arms extending across the plane of said traveling ring and including yoke arms which straddle and pivot about said support member,
means to retain said saddle means at a desired position relative to a given diameter pipe whereby said traveling ring is substantially coaxial with said pipe, and
the further improvement including a plurality of arcuately spaced traveling ring thrust bearing members supported by said support ring, each of said members including a piston spring biased to bear against said traveling ring whereby said ring will maintain substantially coaxial alignment with said support ring.
4. In a beveling machine of the type set forth in claim 3 the improvement wherein said piston is of a synthetic resin.
5. In a beveling machine of the type set forth in claim 3 the improvement including pipe indexed arms attached to each of said saddle arms and movable relative to a fixed marker on said support member.
6. In a beveling machine of the type set forth in claim 5 the improvement wherein said index includes markers for nominal and actual pipe size.

References Cited

UNITED STATES PATENTS

| | | | |
|---|---|---|---|
| 2,159,287 | 5/1939 | Morgan. | |
| 2,807,921 | 10/1957 | Dewino et al. | |
| 2,818,685 | 1/1958 | Becker. | |
| 524,330 | 8/1894 | Lane | 269—156 |
| 2,455,762 | 12/1948 | Hall. | |
| 2,455,742 | 12/1948 | Dorian. | |

JAMES L. JONES, Jr., Primary Examiner

U.S. Cl. X.R.

266—23